United States Patent
Peon et al.

(10) Patent No.: US 7,539,629 B1
(45) Date of Patent: *May 26, 2009

(54) SYSTEM AND METHOD FOR REPLENISHING A WIRELESS TERMINAL ACCOUNT

(75) Inventors: Roberto Peon, Atlanta, GA (US); Luisa Treadway, Auburn, GA (US); Bruce Cotton, Decatur, GA (US); Catherine Meade Lowance, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1312 days.

This patent is subject to a terminal disclaimer.

(21) Appl. No.: 10/252,220

(22) Filed: Sep. 23, 2002

Related U.S. Application Data

(63) Continuation-in-part of application No. 10/177,620, filed on Jun. 20, 2002, now Pat. No. 7,209,890.

(51) Int. Cl.
*G06Q 30/00* (2006.01)
(52) U.S. Cl. .......................... 705/26; 705/21
(58) Field of Classification Search .................. 705/26
See application file for complete search history.

(56) References Cited

U.S. PATENT DOCUMENTS

| | | | |
|---|---|---|---|
| 5,991,407 A * | 11/1999 | Murto | 380/248 |
| 6,144,847 A | 11/2000 | Altschul et al. | |
| 6,169,975 B1 * | 1/2001 | White et al. | 705/44 |
| 6,185,545 B1 | 2/2001 | Resnick et al. | |
| 6,236,851 B1 | 5/2001 | Fougnies et al. | |
| 2002/0091572 A1 * | 7/2002 | Anderson et al. | 705/16 |
| 2002/0156683 A1 * | 10/2002 | Stoutenburg et al. | 705/16 |
| 2002/0181710 A1 * | 12/2002 | Adam et al. | 380/270 |

FOREIGN PATENT DOCUMENTS

EP      1372089 A1 * 12/2003

* cited by examiner

*Primary Examiner*—F. Zeender
*Assistant Examiner*—Paul Danneman
(74) *Attorney, Agent, or Firm*—Withers & Keys, LLC

(57) ABSTRACT

A system and method for replenishing a wireless terminal account of a customer of a telecommunication service provider. In one embodiment the method includes transmitting through a point-of-distribution device a merchant identification, a customer mobile identification number and an amount to the telecommunication service provider. The method also includes validating the merchant identification and crediting the customer account. The method may include delivering a merchant confirmation to the point-of-distribution device and delivering a customer confirmation to the customer's wireless terminal.

23 Claims, 5 Drawing Sheets

FIG. 3

| QUERY | RESPONSE |
|---|---|
| ENTER MERCHANT ID | 1234... |
| ENTER POD IN | 5001... |
| ENTER CUSTOMER MIN | 7342... |
| ENTER AMOUNT IN __CURRENCY | 25 |
| DISCONNECT AND WAIT FOR CONFIRMATION | ...... |

US 7,539,629 B1

SYSTEM AND METHOD FOR REPLENISHING A WIRELESS TERMINAL ACCOUNT

CROSS REFERENCE TO RELATED APPLICATION

The instant application is a continuation-in-part application of U.S. application Ser. No. 10/177,620 filed Jun. 20, 2002 now U.S. Pat. No. 7,209,890.

BACKGROUND

Various prepaid and other methods of payment are available to customers of wireless telecommunication services. When a prepaid amount in a customer's account is exhausted, the customer may replenish the amount by buying a new prepaid card, or by calling a toll-free number to make a payment or by paying an invoice. It may be desirable to make such replenishment methods secure and fraud-resistant without compromising convenience for customers that reside in wide-ranging service areas.

U.S. Pat. No. 6,236,851 discloses a prepaid security cellular telecommunications system. U.S. Pat. No. 6,185,545 discloses an electronic payment system utilizing an intermediary account. U.S. Pat. No. 6,144,847 discloses a wireless telephone with credited airtime.

SUMMARY

One embodiment of the invention provides a method for replenishing a wireless terminal account of a customer of a telecommunication service provider. In one embodiment, the method includes transmitting via a point-of-distribution device a merchant identification, a customer mobile identification number and an amount to the telecommunication service provider. The method may also include validating the merchant identification and crediting the customer account. The method may include delivering a merchant confirmation to the point-of-distribution device and delivering a customer confirmation to the customer's wireless terminal.

BRIEF DESCRIPTION OF THE DRAWINGS

In the accompanying Figures, there are shown present embodiments of the invention wherein like reference numerals are employed to designate like parts and wherein:

FIG. 3 is tabular representation of an embodiment of an Interactive Voice Response dialog according to the present invention.

DETAILED DESCRIPTION OF THE INVENTION

Figure 1:
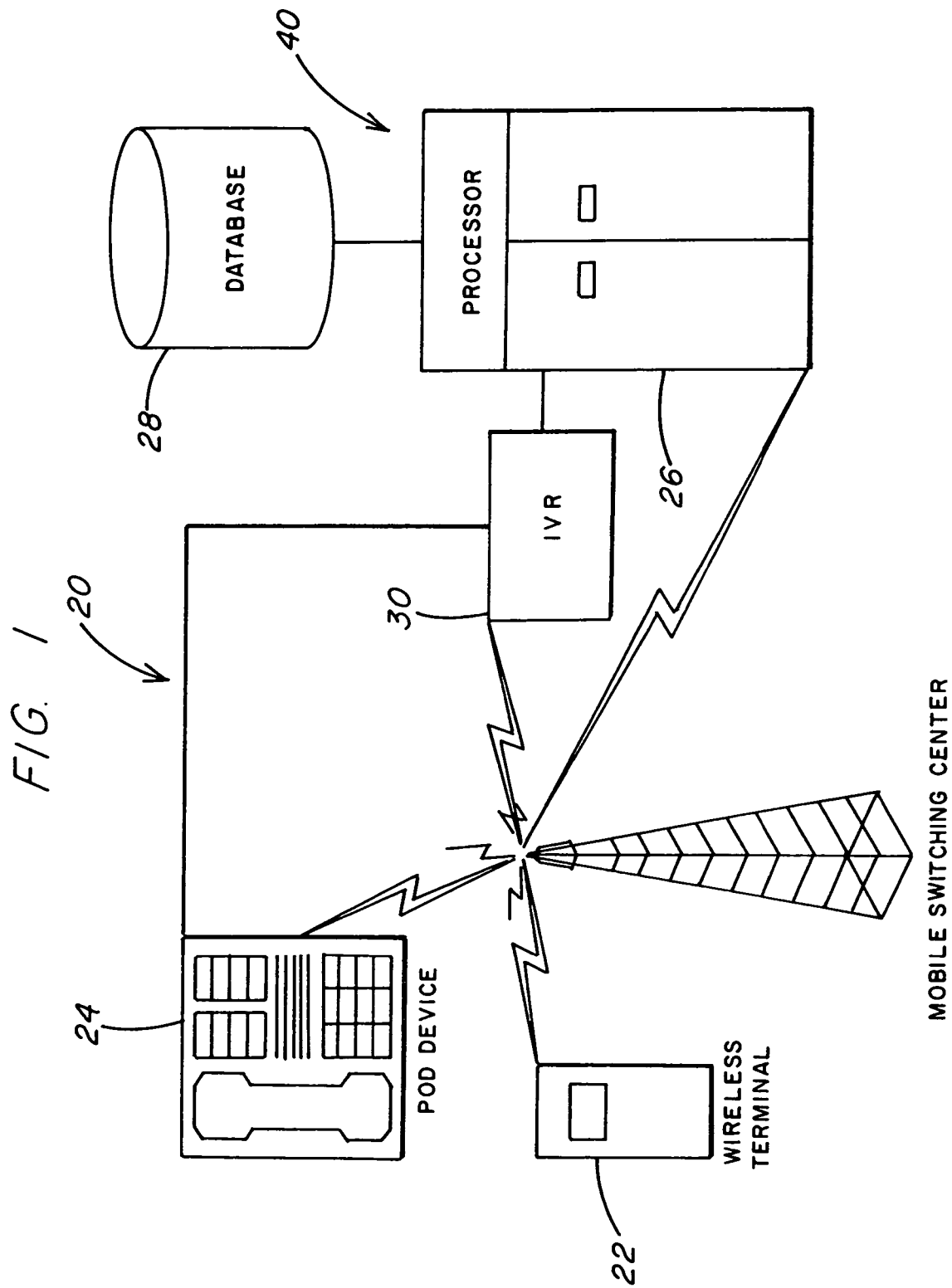
FIG. 1 is a diagram showing an embodiment of a system for replenishing a wireless terminal account according to the present invention.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity.

FIG. 1 is a diagram of an embodiment of a system 20 for the replenishment of an account for a customer of a wireless telecommunication service provider (hereinafter "TSP"). The system 20 may comprise a wireless terminal 22 associated with the customer's account and a point-of-distribution device 24 (hereinafter "POD device"). The POD device 24 may be, for example, in the custody of a merchant who offers replenishment services in addition to engaging in the sale of any other services or goods.

For security and fraud-avoidance purposes, for example, the TSP may issue an identification number (hereinafter "merchant ID") to each merchant who participates in the account replenishment program. The customer's wireless terminal 22 may be identified by a mobile identification number (hereinafter "customer MIN") provided by the TSP. The POD device 24 may also have an identification number (hereinafter "POD IN") associated with it and issued by the TSP.

The POD device 24 may be, for example, a wireless analog or digital handset, a battery-powered handset, a PDA, PC, one or two-way pager, point of sale (POS) device, or a cordless handset or a hard-wired telephone apparatus. It may be dedicated to replenishment purposes or it may also include the functions and capabilities of a telephone handset. Additionally, it may be operated with a credit card scanner, a cash register, etc. The POD device 24 may also be provided with a calling number ID.

In one embodiment, the POD device 24 may be specifically provided by the TSP and it may be restricted to dialing only, for example, one toll-free number or another number to initiate the replenishment process. All other inbound and inbound calls from the POD device 24 may be blocked with the exception of the refresh toll-free access number. Such blocking may be accomplished by known methods, such as the methods used to setup emergency services. This is accomplished by providing a switch that hotlines the POD device 24 to a specified number for all outgoing calls except emergency calls and customer care calls.

The POD device 24 may be configured for entering data, such as, for example, the merchant ID, the customer MIN and the replenishment amount. The POD device 24 may transmit data via hard-wired telephony, satellite, closed-loop, SMPP protocol, 802.11, WAP, I-mode, the Internet or other radio transmittal methods and devices that communicate with an accounting center 40 belonging to the TSP and including a Prepaid Platform for prepaid wireless accounts. The accounting center 40 may include a processor 26 linked to a database 28, which includes customer and merchant account records and the respective customer MINs, merchant IDs and POD INs. The telecommunication service provider may establish a plurality of accounting centers throughout its service areas to accommodate customers residing in urban, suburban, and rural or other remote locations.

Figure 1A:
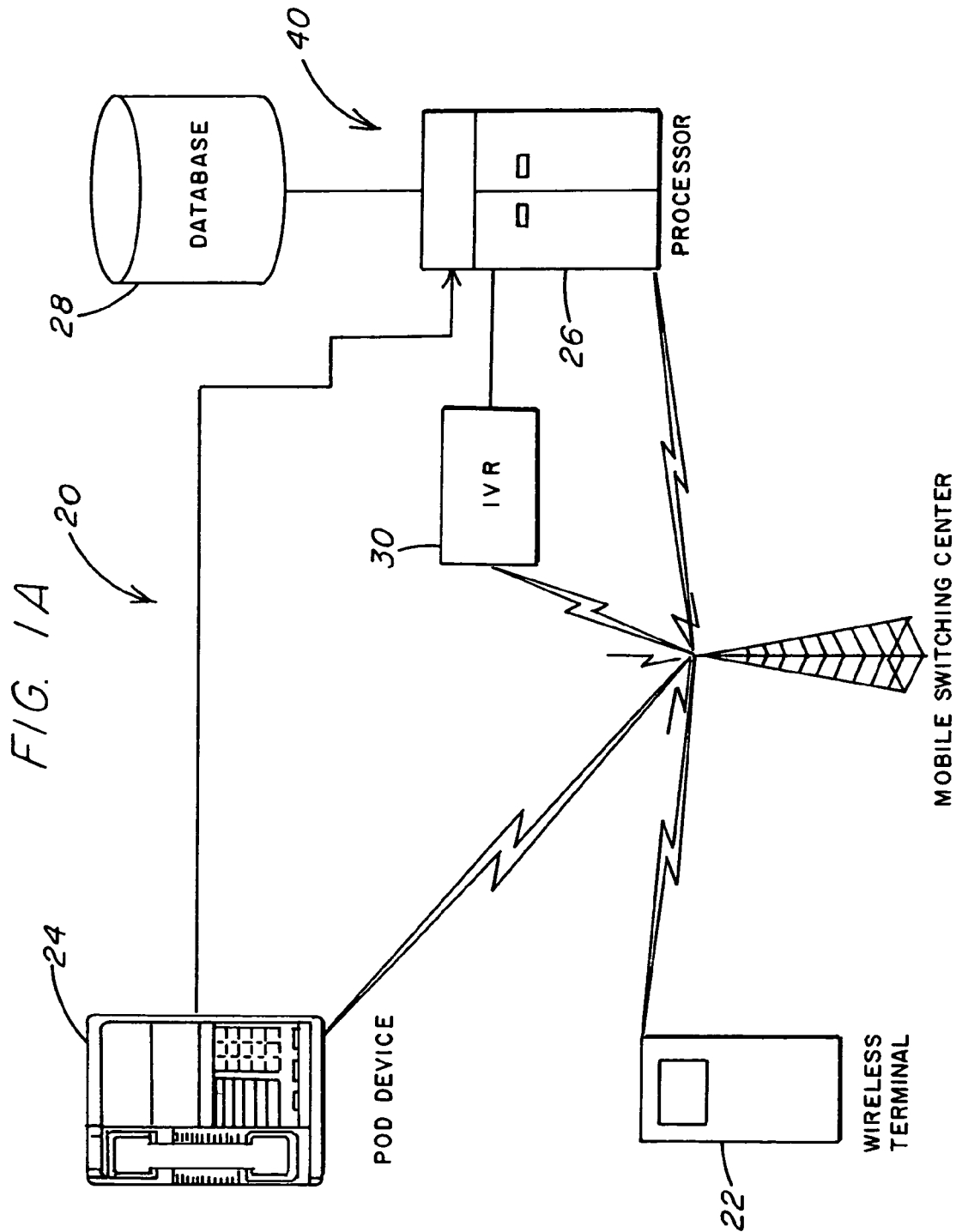
FIG. 1A is a diagram showing an embodiment of a system for replenishing a wireless terminal account according to the present invention.

The POD device 24 may communicate with the accounting center 40 via an Interactive Voice Response module 30 (hereinafter "IVR module") over a Local or Wide Area Network. In another embodiment illustrated in FIG. 1A, the POD device 24 may communicate with the accounting center 40 via the processor 26 over a Local or Wide Area Network. Communicated data may be encrypted using, for example, encryption schemes that are approved by the National Security Agency (NSA).

Figure 2:
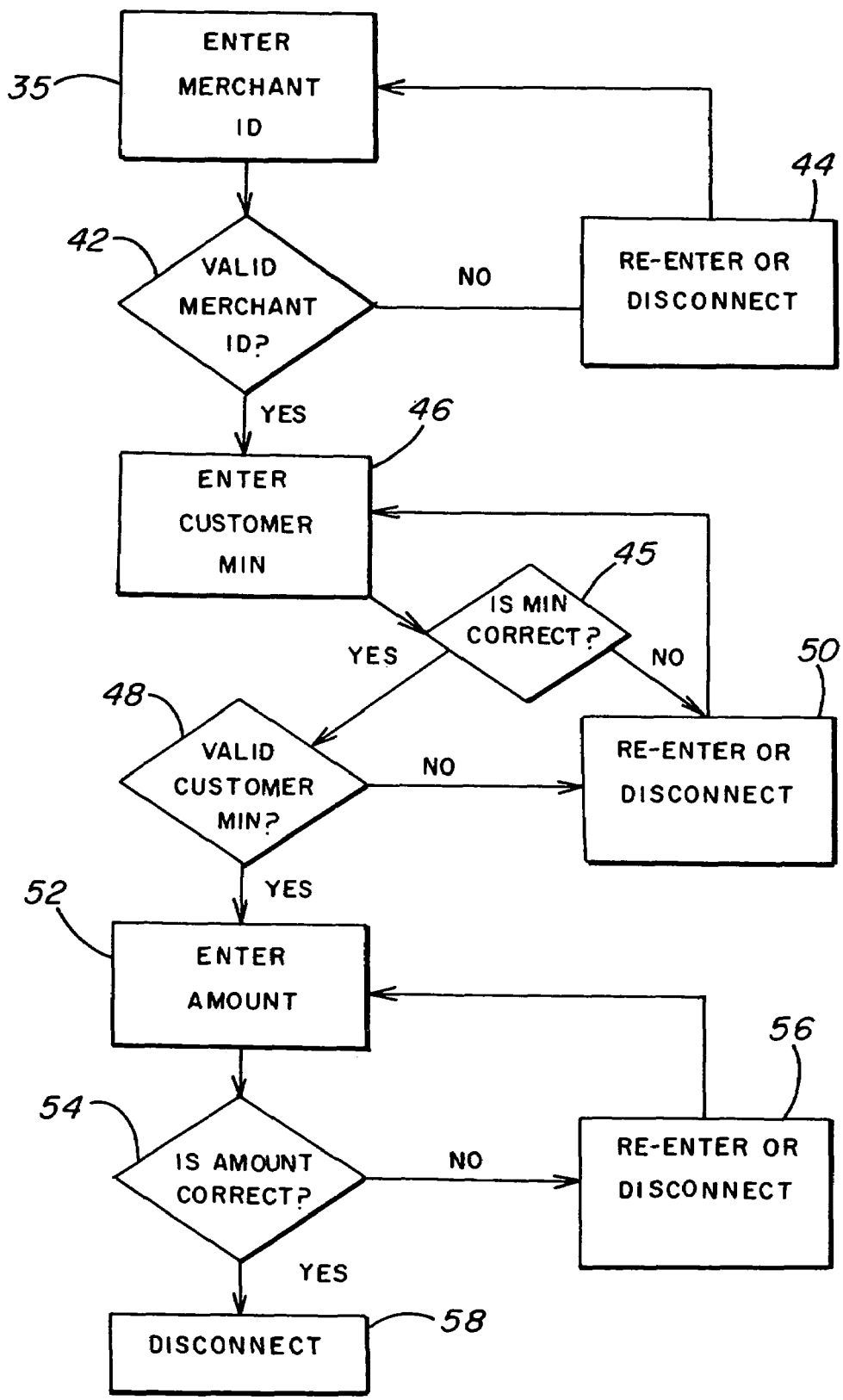
FIG. 2 is a flowchart illustrating an embodiment of method for replenishing a wireless terminal account according to the present invention.

The merchant may dial a number via either a wired or preferably a wireless connection and communicate with the accounting center 40 through the IVR module 30. In one exemplary embodiment, shown in FIG. 2, the IVR module 30 prompts the merchant to enter the merchant ID at step 35. The merchant ID is compared by the processor 26 against a table of merchant IDs and corresponding POD INs for validation at step 42. The POD IN may either be transmitted automatically at the initiation of the call from the corresponding POD device 24, or may be entered manually by the merchant during the IVR dialog. If the merchant's ID cannot be validated, the merchant may, for example, be asked to re-enter the merchant ID or disconnect at step 44.

Once the merchant ID is validated, the IVR module 30 prompts the merchant to enter the customer's MIN at step 46. The IVR module 30 may repeat the customer's MIN for confirmation at step 45. If the MIN was not entered correctly, the customer is asked to re-enter the MIN at step 50. If the MIN is entered correctly, the MIN is compared against a table of active customer MINs in the database 28 at step 48. If the customer's MIN cannot be validated, the merchant may be asked to re-enter the MIN or disconnect at step 50. After the customer's MIN is validated, the IVR module 30 prompts the merchant to enter the amount of replenishment at step 52. The IVR module 30 may also prompt the merchant to verify the amount at step 54 and to re-enter the amount at step 56 or to disconnect at step 58.

The IVR module 30 may also prompt the merchant to enter the POD IN, and then validate the POD IN against the merchant ID in a corresponding table in the database 28. Alternatively, the calling number ID of the POD device 24 may be validated by comparing it in a table in the database 28. An example of the query/answer dialog is illustrated in tabular form in FIG. 3. After all the information is entered, the merchant may be instructed to disconnect and wait for a confirmation.

The IVR module 30 may record the information received from the merchant. The information received is processed by the processor 26 to validate the merchant ID and/or the calling number ID and to update the customer's account records in the database 28.

Figure 4:
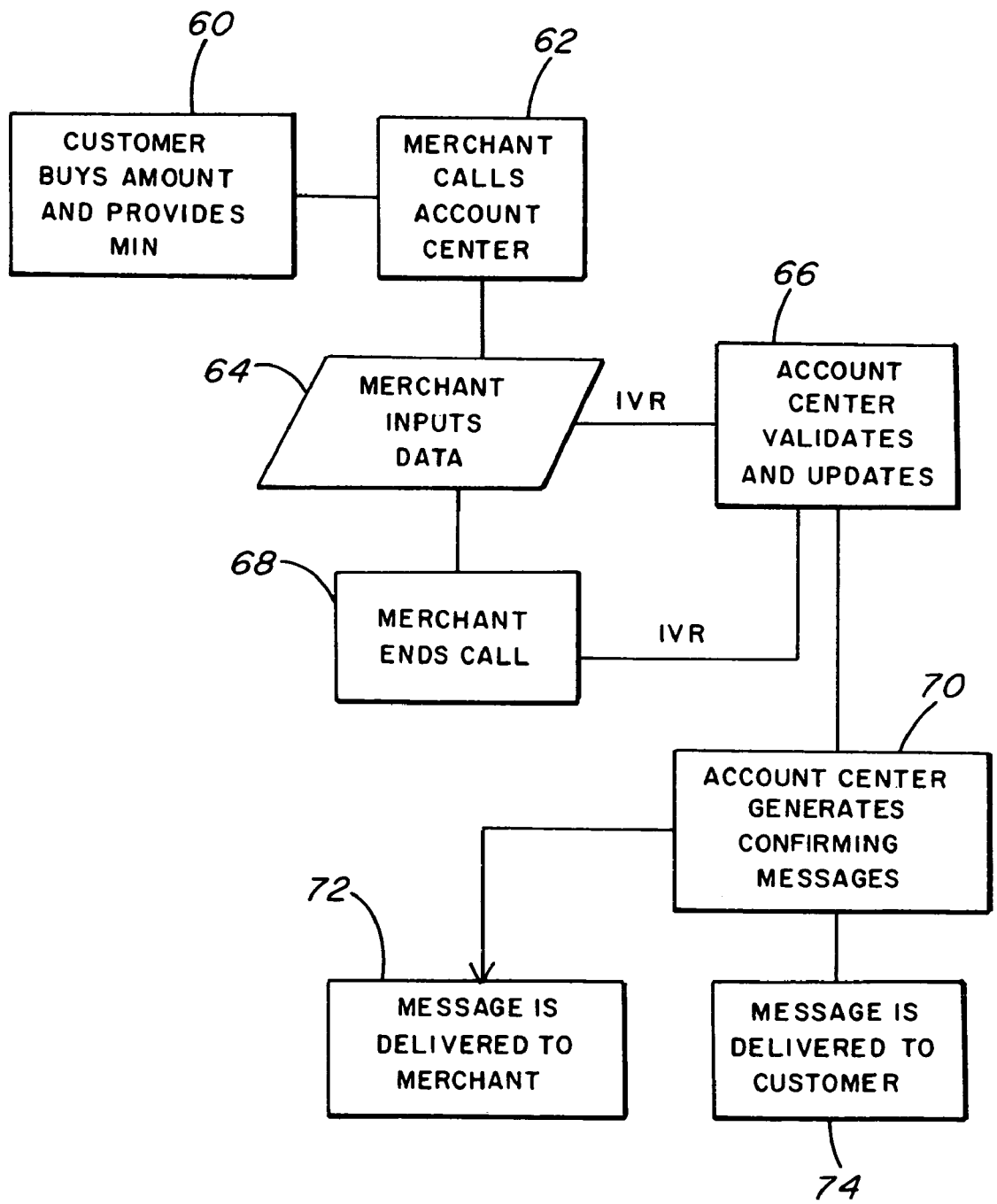
FIG. 4 is a flowchart illustrating an embodiment of a method for replenishing a wireless terminal account according to the present invention.

FIG. 4 illustrates an embodiment of the operation of the system. The customer visits the merchant and buys a replenishment amount for the customer's wireless terminal. The customer also gives its MIN to the merchant at step 60. The merchant uses its POD device 24 to call the account center 40 of the TSP at step 62. The merchant then inputs the relevant data, such as the merchant ID, the POD IN, the customer MIN and the replenishment amount at steps collectively designated as 64. Such inputting may be carried out, for example, interactively through the IVR module 30. The IVR module 30 communicates with the accounting center 40 to validate the identifications and update the customer's account at steps generally designated 66. The merchant may then be instructed to terminate the call at step 68. The accounting center generates confirming messages at step 70. A confirming message may be delivered to the merchant at step 72, and to the customer at step 74.

The confirming message to the merchant may be delivered through, for example, a short message service (hereinafter "SMS") message, which may be delivered without requiring the POD device 24 to be in active mode or within range. Additionally, the SMS messages may remain on the POD device 24 until manually deleted by the merchant or overwritten by subsequent messages. The number of messages that may be stored on the POD device 24 depends on the manufacturer of the device and the features setup.

The confirming message to the customer's wireless terminal 22 may also be in the form of an SMS text message if the customer's terminal 22 supports such messaging. The confirming message may also be delivered as a toll-free call to the customer's wireless terminal 22. Furthermore, the conforming message to the customer may be delivered directly to the customer as a receipt from the merchant.

The merchant may also keep an electronic or paper record of the communication and provide the customer with a receipt of the transaction.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the spirit invention. The preceding description, therefore, is not meant to limit the scope of the invention. Rather the scope of the invention is to be determined only by the appended claims and their equivalents.

What is claimed is:

1. A method for replenishing a wireless terminal account of a customer of a telecommunication service provider, the method comprising:

transmitting through a point-of-distribution device a merchant identification, a customer mobile identification number, a point-of-distribution device identification, and a monetary amount to the telecommunication service provider;

after transmitting, validating the merchant identification and the point-of-distribution device identification;

after validating, crediting the customer account;

after validating, delivering a merchant confirmation to the point-of-distribution device; and after validating, delivering a customer confirmation to the customer's wireless terminal.

2. The method of claim 1, wherein the point-of-distribution device includes a wireless handset.

3. The method of claim 1, wherein the point-of-distribution device is connected to credit card scanner.

4. The method of claim 1, wherein the merchant confirmation message includes a text message.

5. The method of claim 1, wherein the customer confirmation message includes a text message.

6. The method of claim 1, wherein the customer confirmation message includes a telephone call message.

7. The method of claim 1, wherein the customer confirmation message includes a voice message.

8. The method of claim 1, wherein the customer confirmation message includes a receipt from the merchant.

9. The method of claim 1, wherein transmitting includes communicating interactively.

10. The method of claim 1, wherein transmitting includes communicating via an interactive voice response module.

11. The method of claim 1, wherein validating includes comparing against a database of the telecommunication service provider.

12. The method of claim 1, wherein the point-of-distribution device identification is transmitted automatically at an initiation of a call by the point-of-distribution device.

13. The method of claim 1, further comprising transmitting a calling number identification for the point-of-distribution device to the telecommunication service provider validation.

14. A system for replenishing a wireless terminal account of a customer of a telecommunication service provider, the system comprising:

a point-of-distribution device operable to transmit a merchant identification, a mobile identification number for the customer's wireless terminal, a point-of-distribution device identification, and an amount to the telecommunication service provider;

a storage device for storing customer and merchant records; and a processor in communication with the storage device and the point-of-distribution device and operable to validate the merchant identification and the point-of-distribution device identification, to credit the customer's account after validating the merchant identification and the point-of-distribution device identification and to transmit a merchant confirmation message and a customer confirmation message to the customer's wireless terminal after validating the merchant identification and the point-of-distribution device identification.

15. The system of claim 14, wherein the point-of-distribution device includes one of a wireless handset, a PDA, a PC, a point-of-sale device, a pager, a cordless handset, and a hard-wired telephone apparatus.

16. The system of claim 14, wherein the point-of-distribution device is connected to a credit card scanner.

17. The system of claim 14, wherein the point-of-distribution device is connected to a cash register.

18. The system of claim 14, further including an interactive voice response module in communication with the processor.

19. The system of claim 14, wherein the merchant confirmation message includes a text message.

20. The system of claim 14, wherein the customer confirmation message includes a text message.

21. The system of claim 14, wherein the customer confirmation message includes a voice message.

22. The system of claim 14, wherein the customer confirmation message includes a receipt from the merchant.

23. A system for replenishing a wireless terminal account of a customer of a telecommunication service provider, the system comprising:

means for transmitting a merchant identification, a mobile identification number for the customer's wireless terminal, a point-of-distribution device identification, and an amount to the telecommunication service provider;

means for storing customer and merchant records; and processing means in communication with the storage means and the transmitting means for validating the merchant identification and the point-of-distribution device identification, crediting the customer's account after validating the merchant identification and the point-of-distribution device identification and to transmitting a merchant confirmation message and a customer confirmation message to the customer's wireless terminal after validating the merchant identification and the point-of-distribution device identification.

\* \* \* \* \*